US010034483B2

(12) United States Patent
Kociolek et al.

(10) Patent No.: US 10,034,483 B2
(45) Date of Patent: Jul. 31, 2018

(54) NON-POROUS WEIGHTS FOR USE IN FERMENTING VESSELS

(71) Applicants: Emily S. Kociolek, Westmont, IL (US); Krzysztof J. Kociolek, Westmont, IL (US)

(72) Inventors: Emily S. Kociolek, Westmont, IL (US); Krzysztof J. Kociolek, Westmont, IL (US)

( * ) Notice: Subject to any disclaimer, the term of this patent is extended or adjusted under 35 U.S.C. 154(b) by 508 days.

(21) Appl. No.: 14/523,936

(22) Filed: Oct. 26, 2014

(65) Prior Publication Data

US 2016/0113301 A1    Apr. 28, 2016

(51) Int. Cl.
*A23B 7/10*    (2006.01)
*B65D 43/02*    (2006.01)

(52) U.S. Cl.
CPC ......... *A23B 7/105* (2013.01); *B65D 43/0216* (2013.01)

(58) Field of Classification Search
CPC .................. B65D 43/0216; A23B 7/105
USPC .......... 220/216, 578, 796, 805; 482/93, 106, 482/107
See application file for complete search history.

(56) References Cited

U.S. PATENT DOCUMENTS

| 3,741,435 A | * | 6/1973 | Collon | B67C 3/22 220/216 |
| 4,027,778 A | * | 6/1977 | Tupper | A47J 47/02 220/798 |
| 4,106,905 A | * | 8/1978 | Schmitt | B01J 19/16 164/122.1 |
| 4,270,232 A | * | 6/1981 | Ballew | B65D 88/36 126/566 |
| 4,329,918 A | * | 5/1982 | Kuhtreiber | B65D 90/42 220/216 |
| 4,938,377 A | * | 7/1990 | Jarvis | A47G 19/12 220/216 |
| 4,971,318 A | * | 11/1990 | Tracy | A63B 21/0728 482/107 |
| 5,122,470 A | * | 6/1992 | Banes | C12M 23/10 435/297.1 |
| 2004/0005968 A1 | * | 1/2004 | Crawford | A63B 21/0607 482/106 |
| 2005/0075221 A1 | * | 4/2005 | Fond | A63B 21/0724 482/93 |

(Continued)

OTHER PUBLICATIONS

Ziedrich, Linda, "Glass Weights for Small-Batch Pickling", Feb. 14, 2012. Internet-published article printed from <http://agardenerstable.com/2012/02/14/glass-weights-for-small-batch-pickling/> on Oct. 26, 2014. 5 pages.

(Continued)

*Primary Examiner* — James N Smalley
(74) *Attorney, Agent, or Firm* — Marcia L. Doubet

(57) ABSTRACT

An improved weight for use in fermenting vessels (e.g., glazed ceramic fermenting crocks) comprises a multi-sectioned weight made from a non-porous material. The non-porous material is preferably glass, and the glass is preferably non-leaded. In one embodiment, a number of sections of the multi-sectioned weight is 2, and in another embodiment, the number of sections is 4. Use of non-porous material renders the weight impenetrable by the fermenting liquid, and also by mold, harmful bacteria, and/or foul smells that may occur if something goes wrong during the fermentation process.

20 Claims, 7 Drawing Sheets

(56) References Cited

U.S. PATENT DOCUMENTS

2013/0221005 A1\* 8/2013 Raymond ............ B65D 51/007
                                                           220/212
2014/0116271 A1   5/2014 Diggs et al.
2015/0076150 A1\* 3/2015 Jordan .................. B65D 88/36
                                                           220/218

OTHER PUBLICATIONS

Unknown Author, "Large Cermic Fermentation weight", Internet-published article printed from <http://www.naturaltherapyshop.com.au/large-cermic-fermentation-weight/> on Oct. 26, 2014. 2 pages.

Unknown Author, "Finest Ferment Jar Weights", Internet-published article printed from <http://home.beeline-online.net/revrick/jarweights.htm> on Oct. 26, 2014. 2 pages.

Unknown Author, "GLASS Dunking Weights for Fermenting Large, Medium or Small", Internet-published article printed from <http://ozfarmer.com/glass-dunking-weight-for-fermenting> on Oct. 26, 2014. 4 pages.

Unknown Author, "Pickle Pebbles 4 Pack—Glass Fermentation Weights", Internet-published article printed from <http://www.masontops.com/store/p1/Pickle_Pebbles_4_Pack_-_Glass_Fermentation_Weights.html> on Oct. 26, 2014. 1 page.

\* cited by examiner

NON-POROUS WEIGHTS FOR USE IN FERMENTING VESSELS

BACKGROUND

The present invention relates to an improved product for use in fermenting vessels, and more particularly, to an improved weight for use in such vessels.

Fermentation of food products has a long history in many cultures throughout the world. Benefits of consuming fermented food products, such as cabbage that has been fermented to produce sauerkraut or kimchi and cucumbers that are fermented to produce pickles, are well known. Such benefits include improved nutrient levels, improved flavor, and lower cost for the food product, and improved digestion for the person who consumes it. Fermenting also preserves the food product for long-term storage without using heat. Popularity of producing such fermented food products continues to grow. In particular, it is becoming increasingly popular to produce fermented food products in the home for personal consumption.

BRIEF SUMMARY

The present invention is directed to an improved weight for use in fermenting vessels. In one aspect, this comprises a multi-sectioned weight made from a non-porous material. In another aspect, an embodiment of the present invention comprises a fermenting vessel, comprising: a body portion; a neck portion comprising an opening surrounded by a moat structure; a removable cap adapted for placement in the moat structure to cover the opening; and a multi-sectioned weight for placement through the neck portion into the body portion, the multi-sectioned weight made from a non-porous material. The non-porous material is preferably glass, and the glass is preferably non-leaded. In one embodiment, a number of sections of the multi-sectioned weight is 2, and in another embodiment, the number of sections is 4. A radius of each section of the multi-sectioned weight is preferably less than or equal to one half of a diameter of the fermenting vessel, and a length of each section of the multi-sectioned weight is preferably less than or equal to a diameter of the fermenting vessel. The fermenting vessel may be constructed from glazed ceramic.

Various embodiments of these and other aspects of the present invention may be provided in view of the present disclosure. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

DETAILED DESCRIPTION

Figure 1:
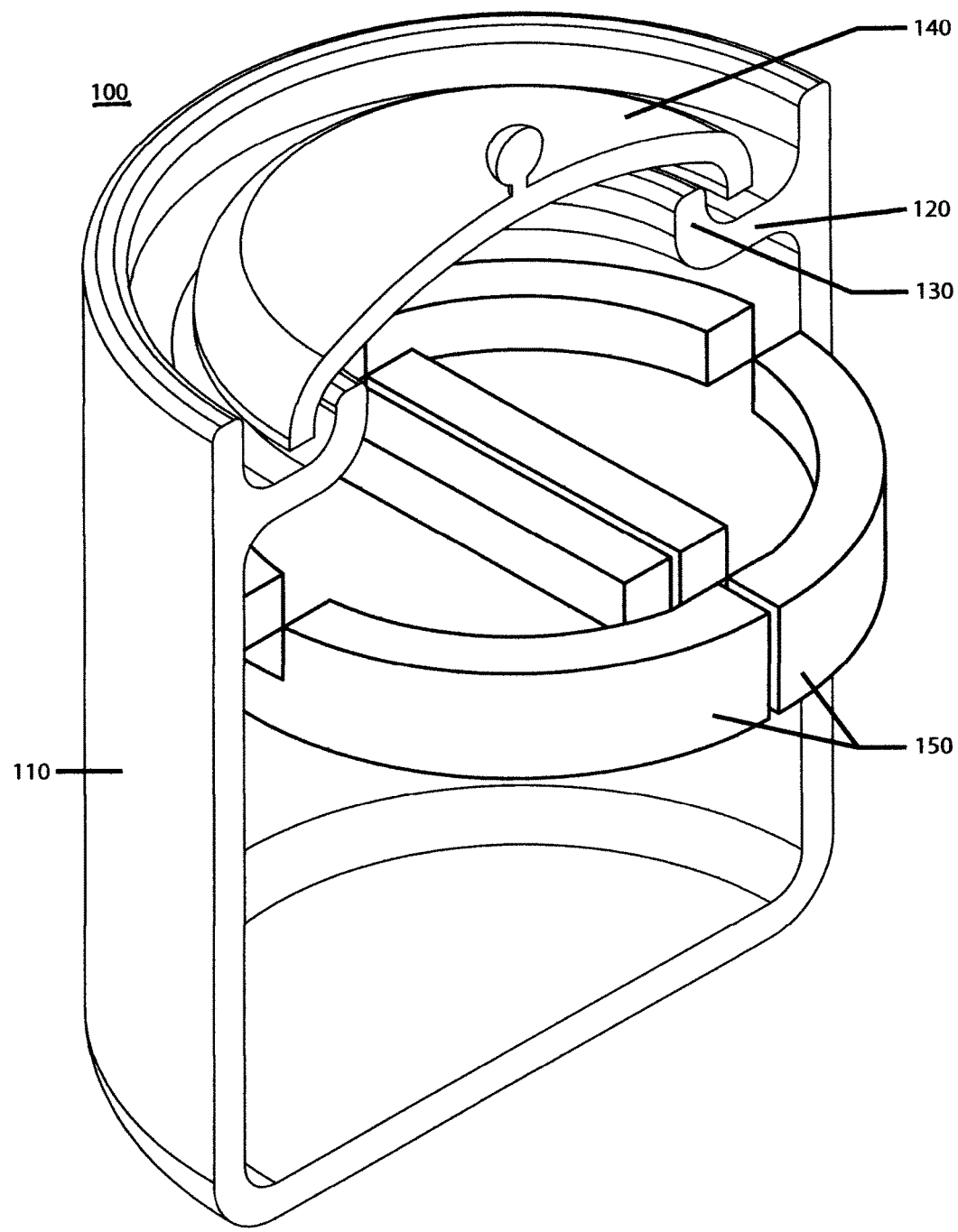
FIG. 1 depicts a side cut-away view of a fermentation vessel in which a weight has been placed, according to an embodiment of the present invention.

Many consumers prefer the various advantages of food products which have been processed by natural fermentation, as was noted above. Natural fermentation commonly uses lacto-fermentation of raw food products (such as vegetables) in brine. In contrast to this natural fermentation, commercially-produced sauerkraut and pickles are typically preserved using a vinegar-based solution. (For ease of reference, discussion herein is directed primarily to fermentation of vegetables, although this is by way of illustration and not of limitation.)

Traditional food fermentation uses a ceramic crock which has been fired in a kiln to glaze all surfaces, with exception of the outside bottom surface or rim, which sits on the kiln surface when fired and therefore remains unglazed. The glazing makes the crockery non-porous and therefore impermeable to liquids. Fermentation vessels are not limited to construction from ceramic, however, and may be constructed from materials such as glass (often referred to as "pickling jars"). Accordingly, references herein to the terms "crock" or "crockery" should be interpreted as applying more generally to a fermenting vessel without regard to the material from which it is constructed, unless the context of the reference indicates otherwise.

The fermentation process typically occurs over a number of days, during which time the vegetables are intended to be submerged in liquid. If the vegetables are exposed to air rather than being submerged, they may begin to spoil and rot, and may become moldy. To assist in keeping the vegetables submerged, a weight is normally introduced into the fermentation vessel. This weight is placed on top of the raw vegetables, and in addition to pressing down on the vegetables to keep them submerged, the weight helps to extract juice from the vegetables.

The weights used in known fermentation vessels are typically formed from unglazed ceramic. Because the ceramic is unglazed, however, it is porous and will absorb liquid during the fermentation process. In a typical fermentation, the unglazed ceramic may also absorb various odors and flavors from the fermenting vegetables. This may be undesirable if a single fermentation vessel is to be used for fermenting different types of vegetables over time. And, if something goes wrong during the fermentation process, the vegetables may rot and/or become moldy. In such cases, the porous weights will absorb the accompanying smells and organisms such as mold and harmful bacteria. It can be very difficult—if not impossible—to remove these smells and harmful organisms from the porous weights. Attempting to reuse the porous weights with another batch of vegetables will typically transfer the smells and harmful organisms to the new batch, leading it to spoil as well. In many cases, the only solution is to purchase new weights and discard the old ones.

The present invention is directed to improved weights for use in fermentation vessels, where these improved weights are made from a non-porous material. Preferably, the non-porous material is glass, and discussions herein therefore refer to the weight as being made from glass. Because the multi-sectioned weight is designed for use with food products, the glass should be non-leaded. The multi-sectioned weights as disclosed herein may be used advantageously in fermenting vessels constructed from glazed ceramic as well as with fermentation vessels constructed from other materials, including glass fermentation vessels. (Note that it is impractical to use glazed ceramic for the weights, because the kiln firing process does not lend itself to glazing the entire outer surface of a fermentation weight.)

It is known to use a single-sectioned glass weight as an insert when fermenting vegetables in a wide-mouthed jar (commonly referred to as a "Mason jar"). In this approach, the single-sectioned glass weight must be somewhat smaller than the mouth of the wide-mouthed jar. This results in a weight which is smaller than the inside dimension of the jar, leaving space around the edge which is not covered by the weight. If too much space remains between the outer edge of the single-sectioned glass weight and the inside edge of the wide-mouthed jar, the vegetables may tend to extend upwards from the brine or may even escape from under the single-sectioned glass weight such that they float above it. This tends to increase the likelihood that the vegetables will come into contact with air, will turn brown, and/or will rot or become moldy.

Fermenting crocks, in contrast, are not formed as wide-mouth vessels. Instead, fermenting crocks have a relatively wide body with a relatively smaller opening or neck portion. The smaller opening is created by a moat-style surface that extends inwardly from the walls of the crock body. See FIG. 1, which depicts a side cut-away view of a fermentation vessel 100 having a body portion 110 and a moat-style surface 120 that creates the smaller opening or neck portion. The moat-style surface 120 includes a lip 130 that is adapted for placement of a lid 140 after the vegetables and any liquids and other ingredients (such as herbs and spices) have been placed within the body 110. The moat is typically filled with water to create an airlock seal which allows gases formed during fermenting to escape.

Because the diameter of the neck portion of this type of fermenting vessel is smaller than the diameter of the body portion, a single-sectioned weight is not suitable, as its small size would allow the vegetables to float above the weight and spoil as noted above. Accordingly, when fermenting in this type of vessel, a multi-sectioned weight is commonly used. Typically, a two-part unglazed ceramic weight has been used, whereby each of the two parts is a generally flat semi-circular unglazed ceramic piece. Use of multiple sections allows inserting each section into the vessel through the smaller-diameter neck portion, and then maneuvering the sections together once inside the vessel.

Figure 2:
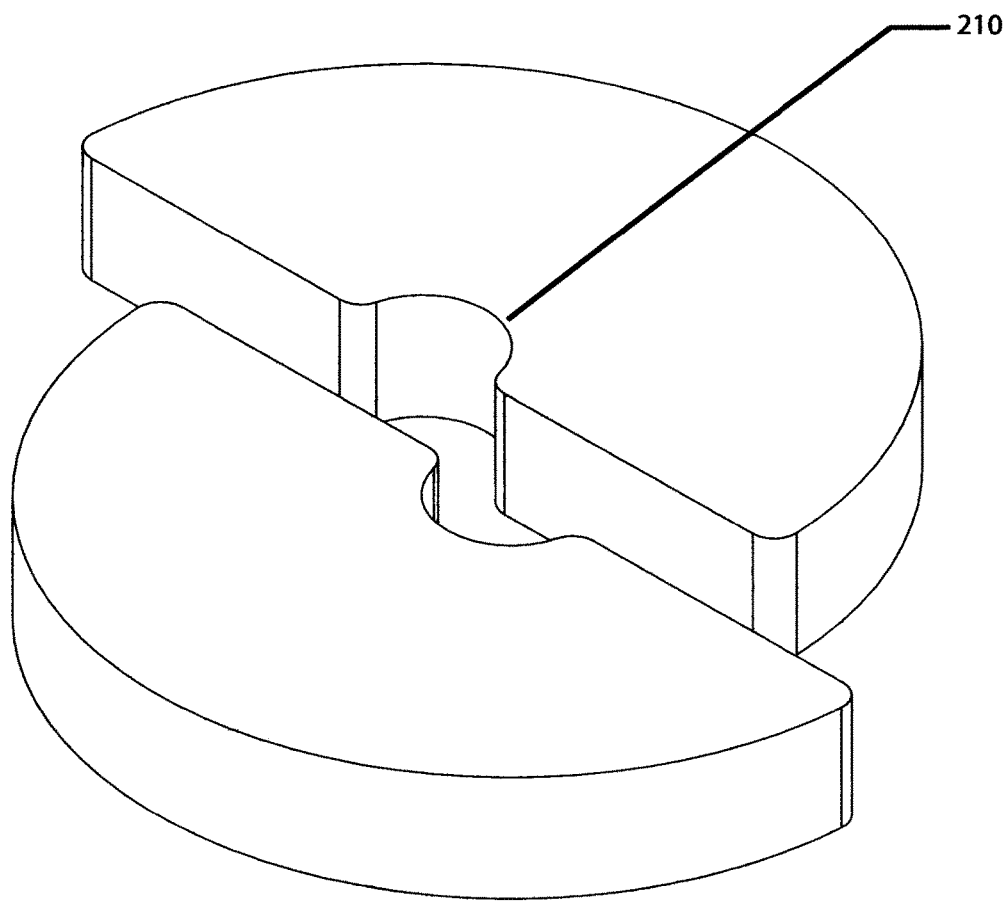
FIG. 2 provides a perspective view of an embodiment of the multi-sectioned weight disclosed herein.
Figure 3:
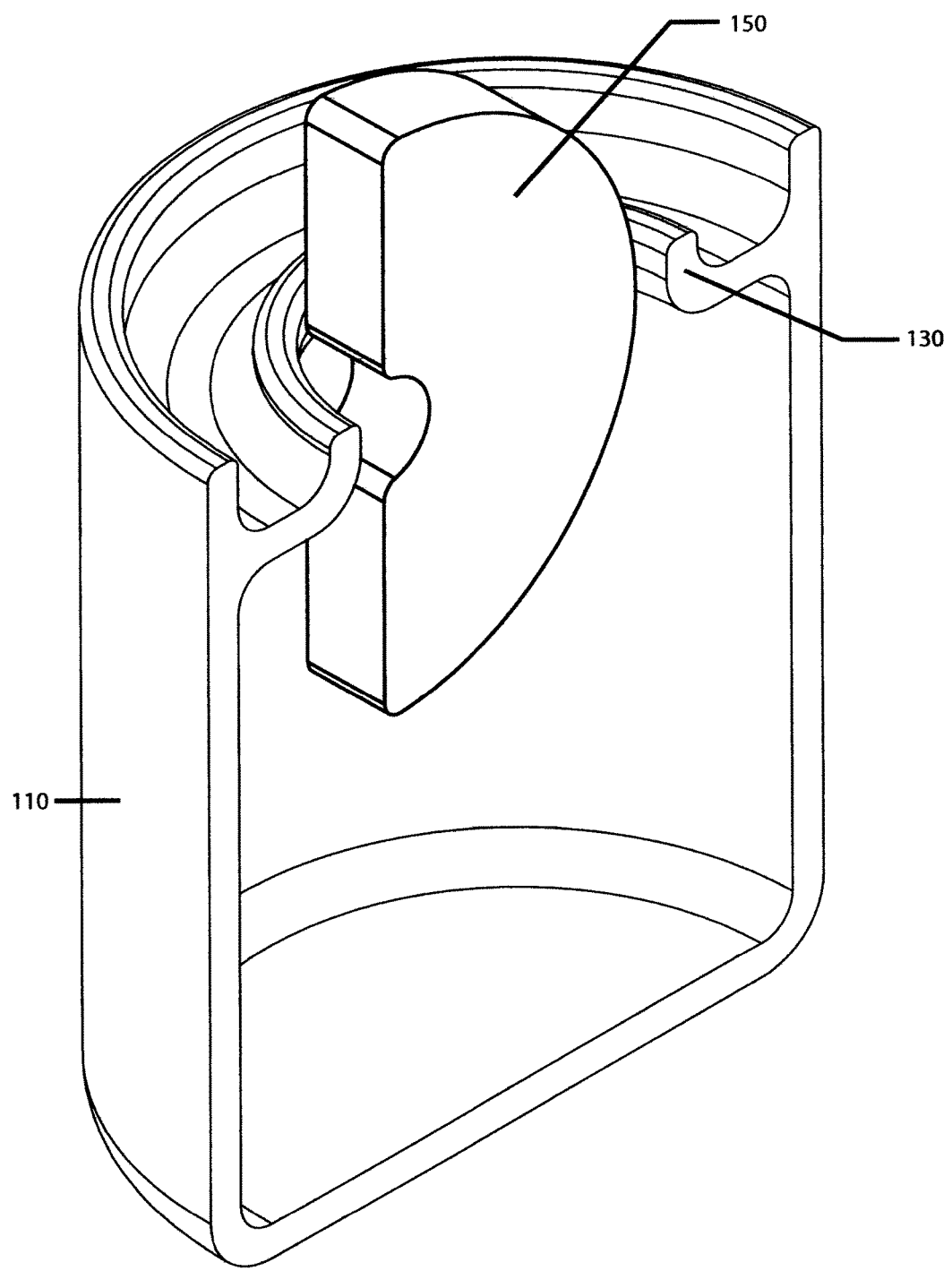
FIG. 3 illustrates a technique for inserting sections of a multi-sectioned weight into a fermentation vessel of the type illustrated in FIG. 1.

An embodiment of the present invention uses a multi-sectioned glass weight, which achieves the weighting objective while avoiding the drawbacks of porous unglazed ceramic. An additional benefit of the weights being made of glass is that the greater density of the glass creates a heavier weight as compared to ceramic. FIG. 2 provides a perspective view of an embodiment of the multi-sectioned weight disclosed herein, and FIG. 3 illustrates a technique for inserting sections of a multi-sectioned weight into a fermentation vessel of the type depicted in FIG. 1. As illustrated in FIG. 3, each individual section of the multi-sectioned glass weight 150 is inserted in a substantially vertical alignment through the opening or neck portion, and is then maneuvered into a horizontal position where the sections are fit together as if part of a single circular object.

While the sections of the multi-sectioned glass weight are illustrated in FIG. 1 as being complete semi-circles, the sections may alternatively include indentations or cut-outs of various shapes. See reference number 210 of FIG. 2, where this use of cut-outs has been illustrated. Use of this type of cut-out may offer advantages such as easier removal of the sections from the vessel when the fermenting process has completed.

Figure 4:
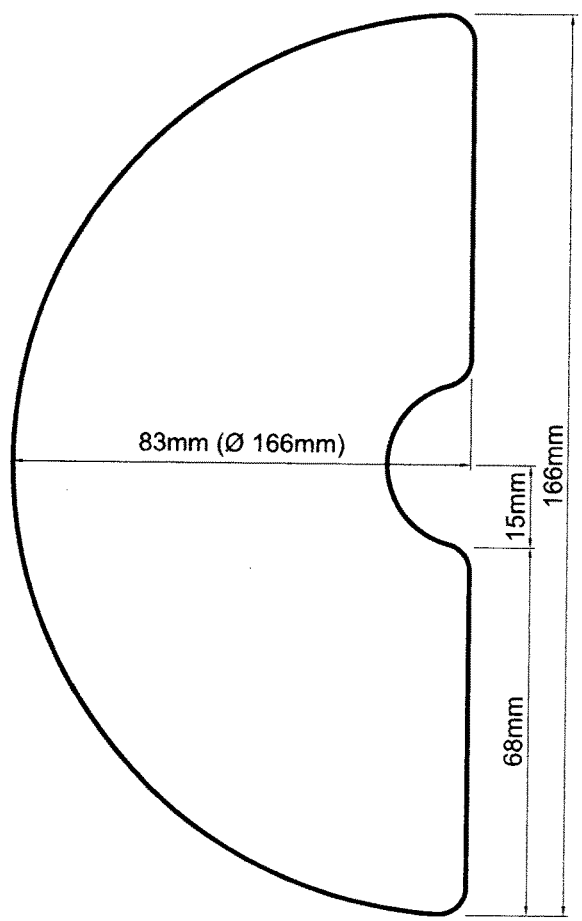
FIGS. 4-5 provide top and cross-sectional side views, respectively, of a section of an embodiment of the multi-sectioned weight disclosed herein.
Figure 5:
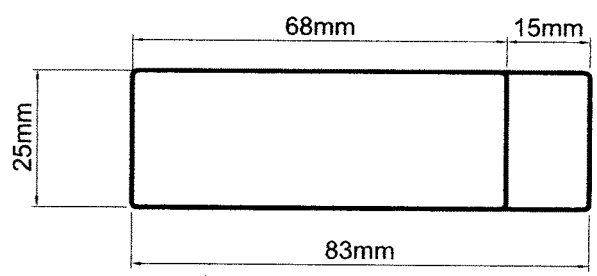

FIGS. 4-5 provide top and cross-sectional side views, respectively, of a section of the multi-sectioned weight. As shown in FIG. 4, the radius of the section of the multi-sectioned weight may be 83 millimeters, in order to be placed within a vessel in which the diameter of the body portion is at least 166 millimeters, which corresponds generally to suitable dimensions for a 5-liter crock (by way of illustration but not of limitation).

Note that while the fermentation vessel 100 of FIG. 1 is depicted as having a relatively cylindrical outer shape, this is by way of illustration and not of limitation. The multi-sectioned glass weights disclosed herein may also be used with vessels in which the outer surface is cylindrical with a first diameter for the body portion, but is then cylindrical with a second, smaller, diameter for the neck portion. See FIG. 6, where a fermentation vessel 600 having this alternative shape is illustrated. This fermentation vessel 600 is illustrated as using a cap 610 that covers the opening or neck portion, rather than using a moat with airlock. The multi-sectioned weights as disclosed herein may be inserted in a substantially vertical alignment through the opening or neck portion and then maneuvered into a horizontal position where the sections are fit together, in a similar manner to that which has been illustrated in FIG. 3.

Figure 6:
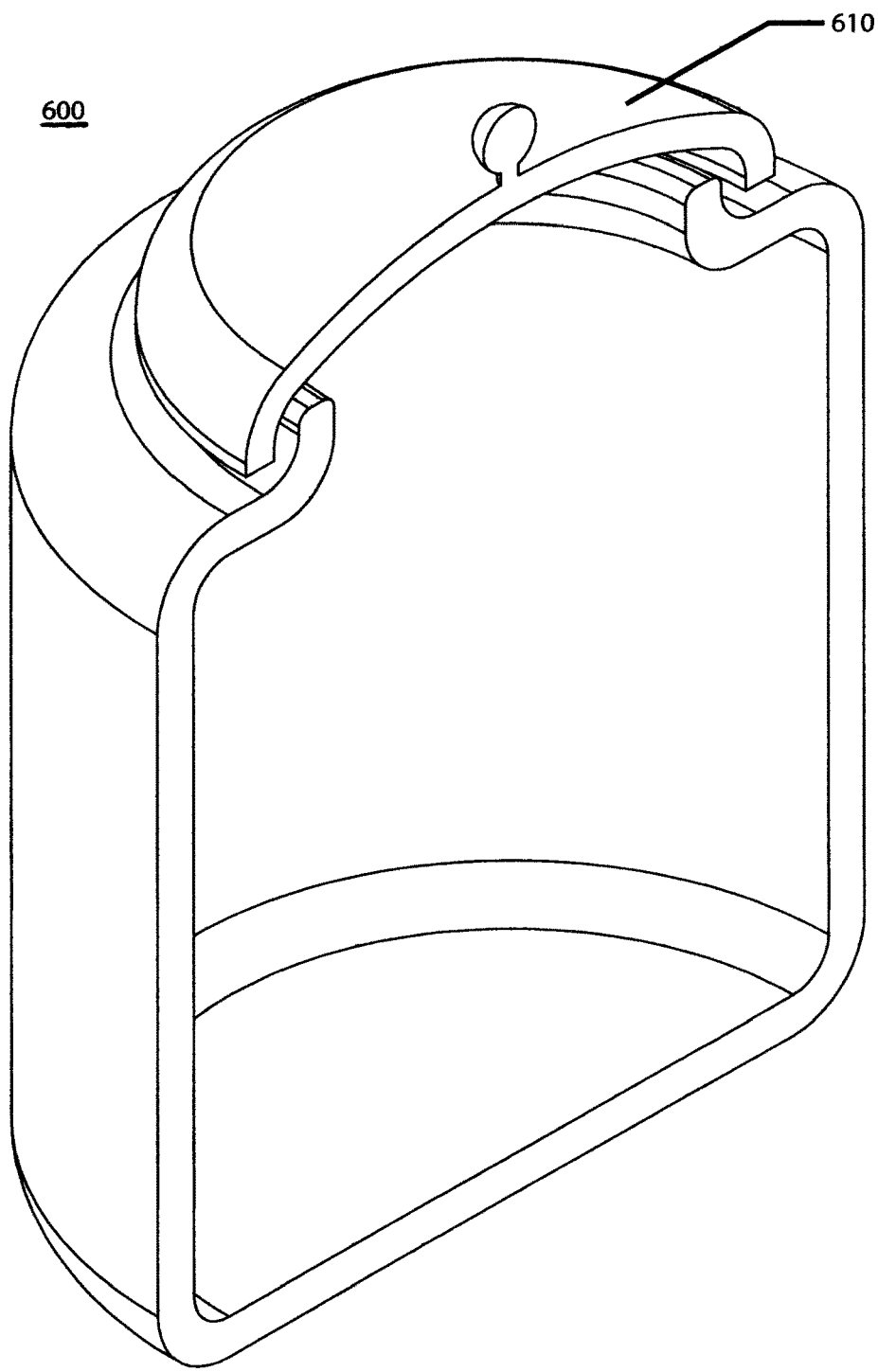
FIGS. 6 and 7 illustrate fermenting vessels having alternative shapes, as compared to FIG. 1.
Figure 7:
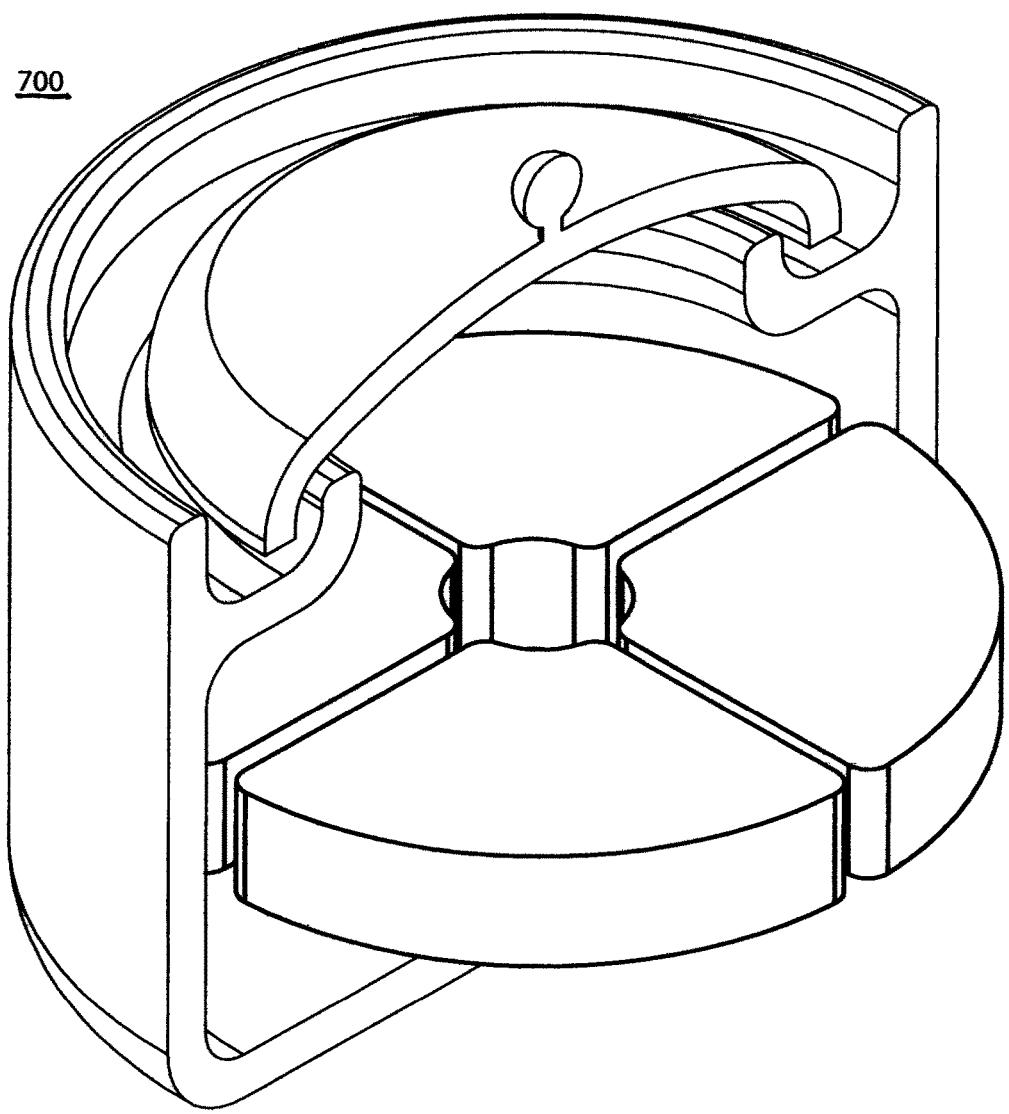
Figure 8:
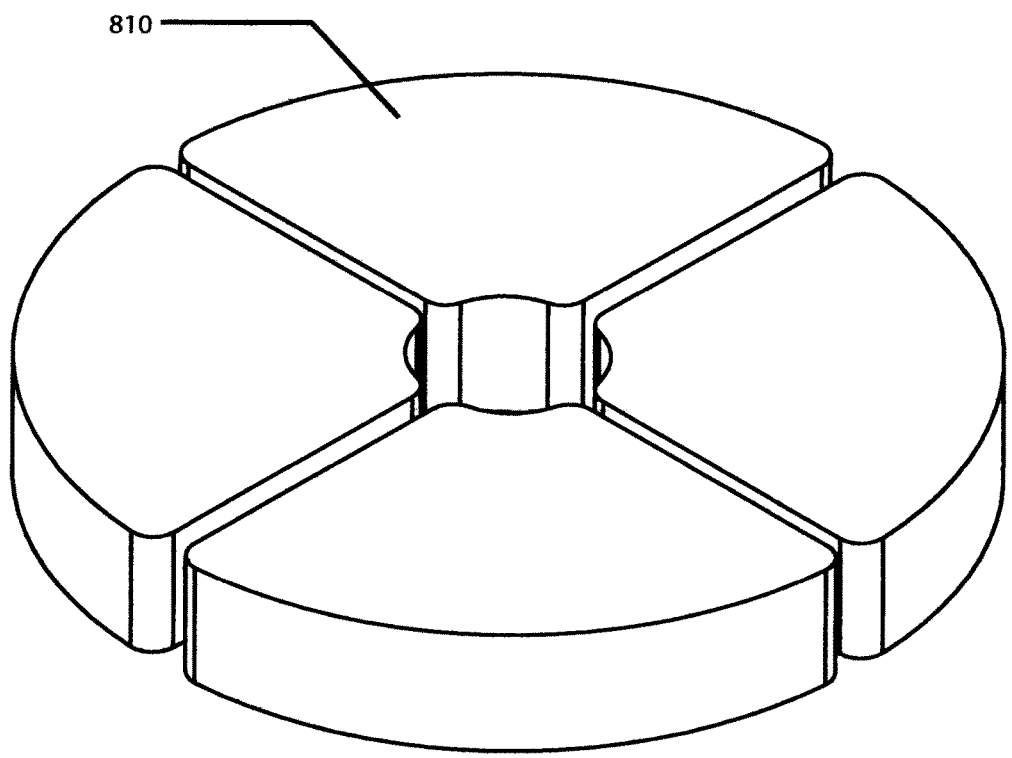
FIG. 8 illustrates a perspective view of an embodiment of the multi-sectioned weight disclosed herein, which may be advantageously used in a fermenting vessel having a shape as illustrated in FIG. 7.

FIG. 7 illustrates a fermenting vessel 700 having yet another alternative shape, as compared to FIGS. 1 and 6. As shown therein, this vessel 700 has a shape where the height is less than the width or diameter. Because of this difference between the height and the width, a weight configured as having 2 sections does not work. (That is, because the length of each section is greater than the depth of the vessel, the sections cannot be inserted using the vertical alignment approach shown in FIG. 3.) Accordingly, in another embodiment, the multi-sectioned weight disclosed herein may be constructed of more than 2 sections. FIG. 8 illustrates a perspective view of an embodiment of the multi-sectioned weight in which 4 sections 810 are used. As will be obvious, the length of each such section 810 is generally half the length of the sections of a 2-sectioned weight, and thus these shorter sections may be inserted relatively easily into the fermenting vessel 700.

It should be noted with reference to the illustration in FIG. 8 that one disadvantage that may result when the number of sections in the weight increases is that the potential increases for items to float in between the sections. The potential for items to extend upwards from the brine around the edge of the weight may also increase as the number of sections increases. However, the inventors are not aware of any multi-sectioned weight (ceramic or otherwise) that is adapted for use in a fermentation vessel of the type illustrated in FIG. 7. Instead, such vessels are generally sold without any weight, leaving it to the consumer to determine how to weight down the vegetables during the fermentation process. Accordingly, it is believed that the advantages of using a weight as illustrated in FIG. 8 outweigh any disadvantage thereof.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. An improved method of fermenting vegetables, comprising:
    placing vegetable material to be fermented and liquid into an interior of a fermenting vessel; and
    placing a multi-sectioned weight into the interior of the fermenting vessel, the multi-sectioned weight made from a non-porous material formed as multiple discrete sections, wherein:
        each of the sections has a top surface, a bottom surface, an outer edge, and at least one inner edge;
        each of the sections is substantially identical;
        the outer edge of each section has two terminal ends, each of which adjoins a terminal end of one of the at least one inner edge of the section;
        the sections are adapted to be collectively disposed within the interior of the fermenting vessel as a single layer in which the inner edge of each section abuts to the inner edge of another section without overlap thereupon and in which the collective outer edge of the disposed sections forms a curved shape generally matching a curved shape of the interior of the fermenting vessel; and
        the non-porous material is selected as having a density that causes the collectively disposed sections to submerge the vegetable material within the liquid.

2. The method according to claim 1, wherein the non-porous material is glass.

3. The method according to claim 2, wherein the glass is non-leaded.

4. The method according to claim 1, wherein a number of the sections of the multi-sectioned weight is 2.

5. The method according to claim 1, wherein a number of the sections of the multi-sectioned weight is 4.

6. The method according to claim 1, wherein a radius of each of the sections of the multi-sectioned weight is less than or equal to one half of a diameter of the interior of the fermenting vessel.

7. The method according to claim 1, wherein a length of each of the sections of the multi-sectioned weight is less than or equal to a diameter of the interior of the fermenting vessel.

8. The method according to claim 1, wherein the collectively disposed sections fit together in the single layer to give the single layer a shape of a single circular object.

9. A fermenting vessel, comprising:
    a body portion;
    a neck portion comprising an opening surrounded by a moat structure;
    a removable cap adapted for placement in the moat structure to cover the opening; and
    a multi-sectioned weight for placement through the neck portion into an interior of the body portion, the multi-sectioned weight made from a non-porous material formed as multiple discrete sections, wherein:
        each of the sections has a top surface, a bottom surface, an outer edge, and at least one inner edge;
        each of the sections is substantially identical;
        the outer edge of each section has two terminal ends, each of which adjoins a terminal end of one of the at least one inner edge of the section; and
        the sections are adapted to be collectively disposed within the interior of the body portion as a single layer in which the inner edge of each section abuts to the inner edge of another section without overlap thereupon and in which the collective outer edge of the disposed sections forms a curved shape generally matching a curved shape of the interior of the body portion.

10. The fermenting vessel according to claim 9, wherein the non-porous material is glass.

11. The fermenting vessel according to claim 10, wherein the glass is non-leaded.

12. The fermenting vessel according to claim 9, wherein a number of the sections of the multi-sectioned weight is 2.

13. The fermenting vessel according to claim 9, wherein a number of the sections of the multi-sectioned weight is 4.

14. The fermenting vessel according to claim 9, wherein a radius of each of the sections of the multi-sectioned weight is less than or equal to one half of a diameter of the interior of the fermenting vessel.

15. The fermenting vessel according to claim 9, wherein a length of each of the sections of the multi-sectioned weight is less than or equal to a diameter of the interior of the fermenting vessel.

16. The fermenting vessel according to claim 9, wherein the fermenting vessel is constructed from glazed ceramic.

17. The fermenting vessel according to claim 9, wherein a density of the non-porous material enables the collectively disposed sections to submerge within the interior of the fermenting vessel.

18. The fermenting vessel according to claim 9, wherein the collectively disposed sections fit together in the single layer to give the single layer a shape of a single circular object.

19. The method according to claim 1, further comprising placing a cover over the fermenting vessel.

20. A fermenting vessel, comprising:
    a body portion;
    a neck portion comprising an opening into the body portion, wherein an inner diameter of the opening is less than an inner diameter of the body portion;
    a removable cap adapted for placement to cover the opening; and
    a multi-sectioned weight for placement through the opening into an interior of the body portion, the multi-sectioned weight made from a non-porous material formed as multiple discrete sections, wherein:
        each of the sections has a top surface, a bottom surface, an outer edge, and at least one inner edge;
        each of the sections is substantially identical;
        the outer edge of each section has two terminal ends, each of which adjoins a terminal end of one of the at least one inner edge of the section; and
        the sections are adapted to be collectively disposed within the interior of the body portion as a single layer in which the inner edge of each section abuts to the inner edge of another section without overlap thereupon and in which the collective outer edge of the disposed sections forms a curved shape generally matching a curved shape of the interior of the body portion.

* * * * *